US007551370B2

(12) United States Patent
Vinogradov et al.

(10) Patent No.: US 7,551,370 B2
(45) Date of Patent: Jun. 23, 2009

(54) NEGATIVE SPHERICAL ABERRATION COMPONENT-BASED IMAGING LENS ASSEMBLY IN IMAGING READER

(75) Inventors: Igor Vinogradov, Bay Shore, NY (US); Vladimir Gurevich, Stony Brook, NY (US); David Tsi-Shi, Stony Brook, NY (US)

(73) Assignee: Symbol Technologies, Holtsville, NY (US)

( * ) Notice: Subject to any disclaimer, the term of this patent is extended or adjusted under 35 U.S.C. 154(b) by 185 days.

(21) Appl. No.: 11/496,335

(22) Filed: Jul. 31, 2006

(65) Prior Publication Data

US 2008/0030874 A1 Feb. 7, 2008

(51) Int. Cl.
*G02B 13/18* (2006.01)
*G02B 9/00* (2006.01)

(52) U.S. Cl. ........................................ 359/709; 359/738

(58) Field of Classification Search ................. 359/709, 359/738–740
See application file for complete search history.

(56) References Cited

U.S. PATENT DOCUMENTS 7,063,261 B2 * 6/2006 Vinogradov et al. ........ 235/454

* cited by examiner

*Primary Examiner*—Scott J Sugarman

(57) ABSTRACT

An imaging lens assembly focuses light from indicia in a working range of distances along an optical path onto a solid-state imager of an imaging reader. The lens assembly includes a negative spherical aberration component and an aperture stop that together are operative for extending the working range.

20 Claims, 3 Drawing Sheets

40 64 62 60 56 52 50 58 54

56 64 52 62 60 50 52 58 40 54

24
10
14
20
22
18
12
16

30

26
28
34
32

WD2
20
18
WD1
16
ILLUMINATOR
42
43
41
ILLUMINATOR
42
IMAGING
ARRAY
40
MICRO-
PROCESSOR
36

NEGATIVE SPHERICAL ABERRATION COMPONENT-BASED IMAGING LENS ASSEMBLY IN IMAGING READER

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, horizontal window is set flush with, and built into, a horizontal countertop of the workstation. Products to be purchased bear an identifying symbol and are typically slid or swiped across the horizontal window through which a multitude of scan lines in a scan pattern is projected in a generally upward direction. Each scan line is generated by sweeping a laser beam from a laser. When at least one of the scan lines sweeps over a symbol associated with a product, the symbol is processed and read.

Instead of, or in addition to, a horizontal slot scanner, it is known to provide a vertical slot scanner, which is typically a portable reader placed on the countertop such that its window is generally vertical and faces an operator at the workstation. The generally vertical window is oriented perpendicularly to the horizontal window, or is slightly rearwardly inclined. A scan pattern generator within the vertical slot scanner also sweeps a laser beam and projects a multitude of scan lines in a scan pattern in a generally outward direction through the vertical window toward the operator. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and for processing two-dimensional symbols, such as Code 39, as well. Code 39 introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers, instead of moving a laser beam across the symbols in a scan pattern. For example, an image sensor device may be employed which has a one- or two-dimensional array of cells or photosensors, which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information over a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to focus light from the symbol onto the photosensors by an imaging lens assembly in front of the image sensor device. The known lens assembly typically comprises a plurality of lenses of different sizes and powers. It is further known to use an axicon with and without an aperture stop, as well as a negative spherical aberration component to extend the depth of field of moving laser beam readers. It is still further known to use a cubic phase plate, as well as an asymmetrical prism and a soft aperture, in the light collection assemblies of imaging readers. Although generally satisfactory for their intended purpose, the known imaging lens assemblies cause the known imaging readers to have a limited working range and relatively slow data capture, thereby limiting the usefulness of the known imaging lens assemblies in imaging reader applications where rapid data capture and/or an extended working range are needed.

SUMMARY OF THE INVENTION

One feature of the present invention resides, briefly stated, in a reader for, and a method of, electro-optically reading indicia, especially one- or two-dimensional symbols. The reader could be embodied as a stationary or portable point-of-transaction workstation having a window, or as a handheld reader having a window. In some applications, the window can be omitted, in which event, the reader has a windowless opening at which the indicia are located for reading. As used herein, the term "presentation area" is intended to cover both a window and a windowless opening. In the case of the workstation, the symbol is swiped past, or presented to, the presentation area and, in the case of the handheld reader, the reader itself is moved and the presentation area is aimed at the symbol. In the preferred embodiment, the workstation is installed in a retail establishment, such as a supermarket.

A one- or two-dimensional, solid-state imager is mounted in the reader, and includes an array of image sensors arranged in a plane and operative for capturing light from a one- or two-dimensional symbol or target through the presentation area over a field of view during the reading. Preferably, the array is a CCD or a CMOS array.

When the reader is operated in low light or dark environments, an illuminator is also mounted in the reader and illuminates the symbol during the reading with illumination light directed from an illumination light source through the presentation area. The illumination light source is preferably at least one light emitting diode (LED), and preferably a plurality of LEDs.

In accordance with this invention, an imaging lens assembly is provided in the housing for focusing the illumination light from the indicia along an optical path or axis onto the sensors. The lens assembly includes a negative spherical aberration component and an aperture stop together operative for focusing both on-axis and off-axis illumination light on and over the plane of the array, and for extending the working range. The negative spherical aberration component is positioned as close as possible to the aperture stop and preferably both lie in the same plane. In the preferred embodiment, the assembly further includes a pair of end focusing lenses spaced apart along the optical path, and the negative spherical aberration component and the aperture stop are located in the optical path between the end focusing lenses. In other embodiments, all of the lenses can be located at either side of the coplanar negative spherical aberration component and the aperture stop. The negative spherical aberration component and the aperture stop may be separate components or preferably are incorporated into a single optical component. It is especially preferred if the negative spherical aberration component, the aperture stop and one of the lenses of the assembly are fabricated as a single optical component. The negative spherical aberration can be introduced by application of plastic aspheric replica on a glass substrate, or directly on one of the lenses to form an integrated one-piece construction. Alternatively, the negative spherical aberration can be introduced by a separate optical component, e.g., a phase plate.

Where the negative spherical aberration component is a separate optical element, it preferably has a substantially flat surface generally perpendicular to the optical path, and a second concave surface centered on the optical path. The negative spherical aberration component can receive incident illumination light through the flat surface and bend, preferably by refraction, the illumination light for passage through its concave surface. The negative spherical aberration component is circular and preferably optically symmetrical about the optical path. The circular refractive negative spherical aberration component can have alternate shapes, e.g., elliptical or cylindrical, and/or can be replaced with a diffractive element, although this is not preferred since the refractive negative spherical aberration component has superior contrast and a higher signal-to-noise ratio because it eliminates stray light and chromatic aberrations associated with diffractive negative spherical aberration components.

The aperture stop limits the size and/or shape of the light that passes therethrough. The limited extent of the light passing through the aperture stop, together with the light bending properties of the negative spherical aberration component, focus both on-axis and off-axis illumination light on and over the plane of the array, and establish an extended working range for the imaging reader. Preferred embodiments use circular apertures that limit the radius of light passing therethrough; however, other aperture shapes, such as elliptical or rectangular, can be used.

Negative spherical aberration is an intrinsic defect that prevents light from being focused at a precise point. It is conventional for an optical designer to compensate for and correct such aberrations. However, in accordance with this invention, a deliberately overcorrected optical lens component is used for increasing the working range. No apodization at the plane of the aperture stop is needed, since a conventional aperture stop can be employed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
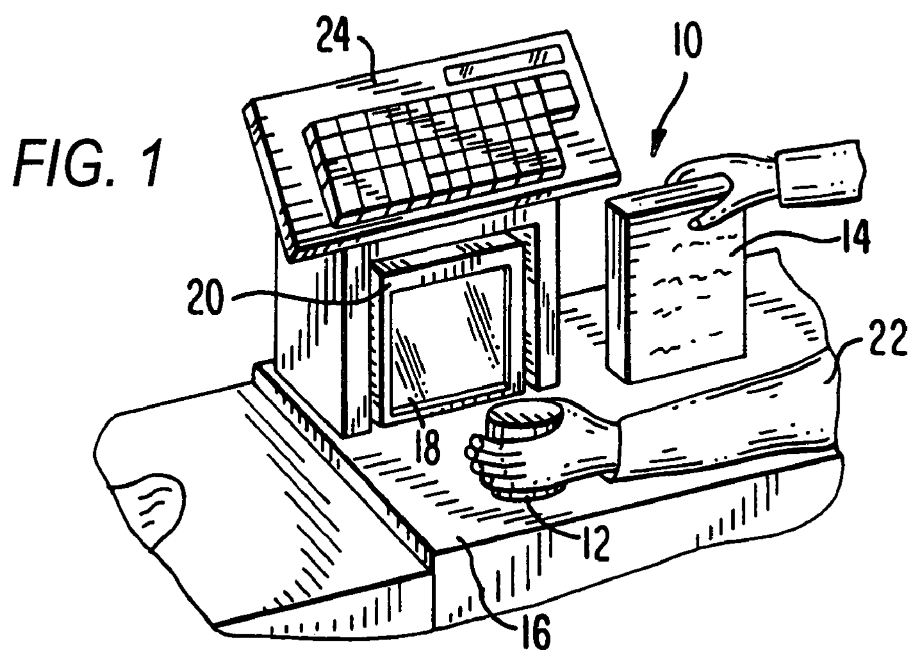
FIG. 1 is a perspective view of a point-of-transaction workstation operative for capturing light from symbol-bearing targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a vertical window (i.e., presentation area) 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
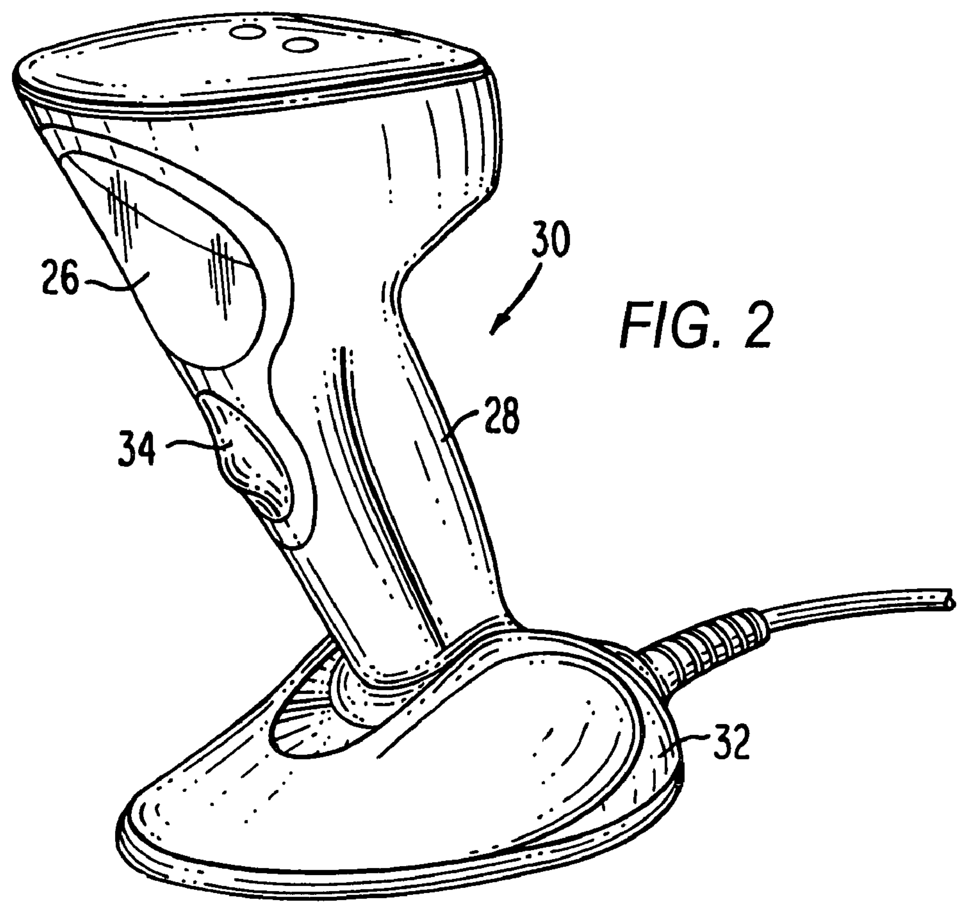
FIG. 2 is a perspective view of an electro-optical reader operative in either a hand-held mode, or a workstation mode, for capturing light from symbol-bearing targets in accordance with this invention.

Reference numeral 30 in FIG. 2 generally identifies another reader having a different configuration from that of reader 20. Reader 30 also has a generally vertical window (i.e., presentation area) 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

Figure 3:
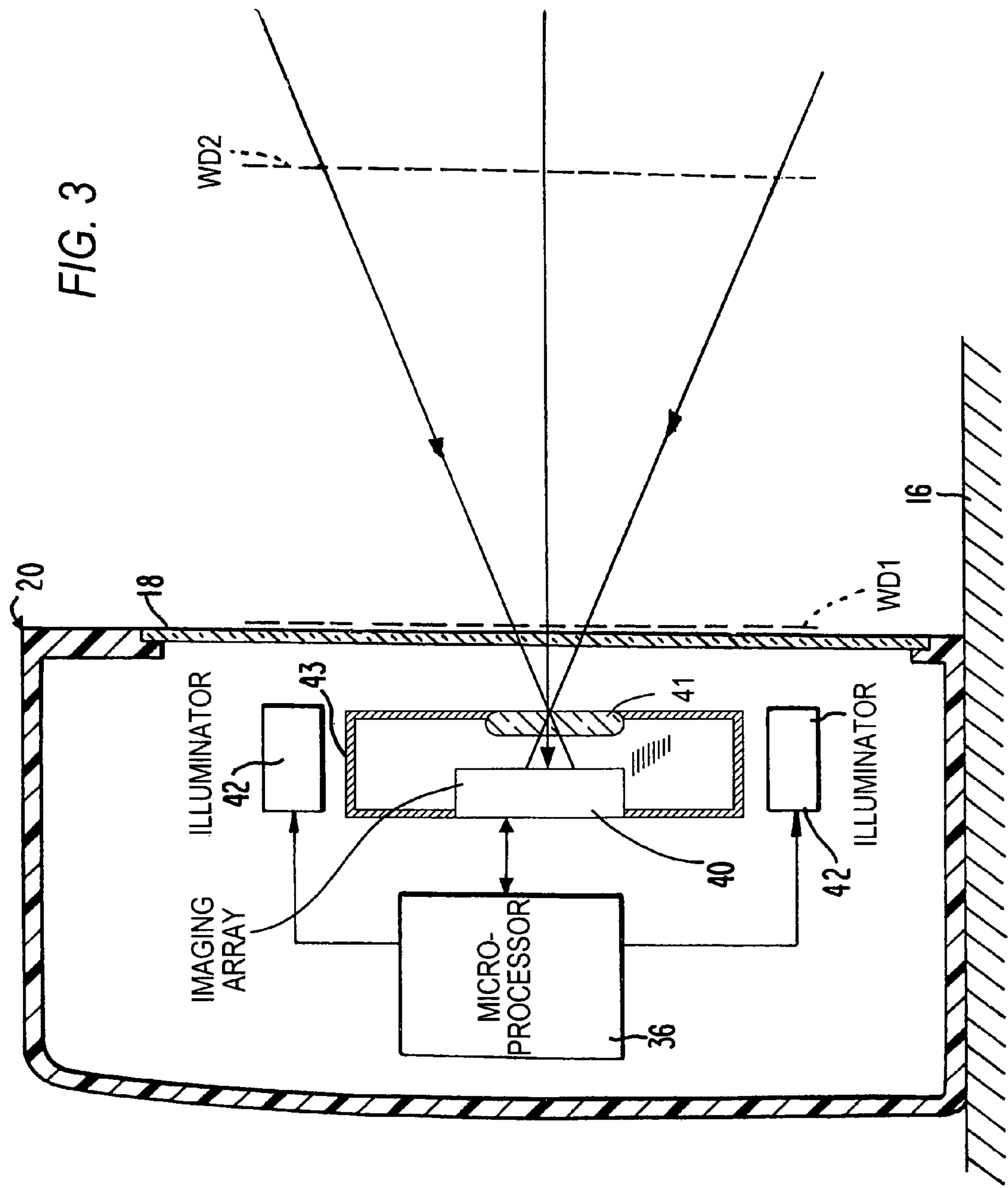
FIG. 3 is a block diagram of various components of the workstation of FIG. 1.

As described so far, the readers 20, 30 are conventional. As schematically shown in FIG. 3, an imager 40 and an imaging lens assembly 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator is also mounted in the reader and preferably includes a plurality of light sources, e.g., light emitting diodes (LEDs) 42, arranged at opposite sides of the imager 40 to uniformly illuminate the target.

As shown in FIG. 3, the imager 40 and the illuminator LEDs 42 are operatively connected to a controller or microprocessor 36 operative for controlling the operation of these components. Preferably, the microprocessor is the same as the one used for decoding light scattered from the indicia and for processing the captured target images.

In operation, the microprocessor 36 sends a command signal to pulse the illuminator LEDs 42 for a short time period, say 500 microseconds or less, and energizes the imager 40 to collect light from a target symbol only during said time period. A typical array needs about 33 milliseconds to read the entire target image and operates at a frame rate of about 30 frames per second. The array may have on the order of one million addressable image sensors.

Although the aforementioned imaging lens assembly 41 is depicted as a single lens, this was done to simplify the drawing. In practice, the lens assembly 41 includes a plurality of optical lenses arranged along the optical path to focus the illumination light from the indicia onto the imager. In the prior art, these lenses are configured with different sizes and different optical powers, thereby increasing the overall size of the assembly.

Figure 5:
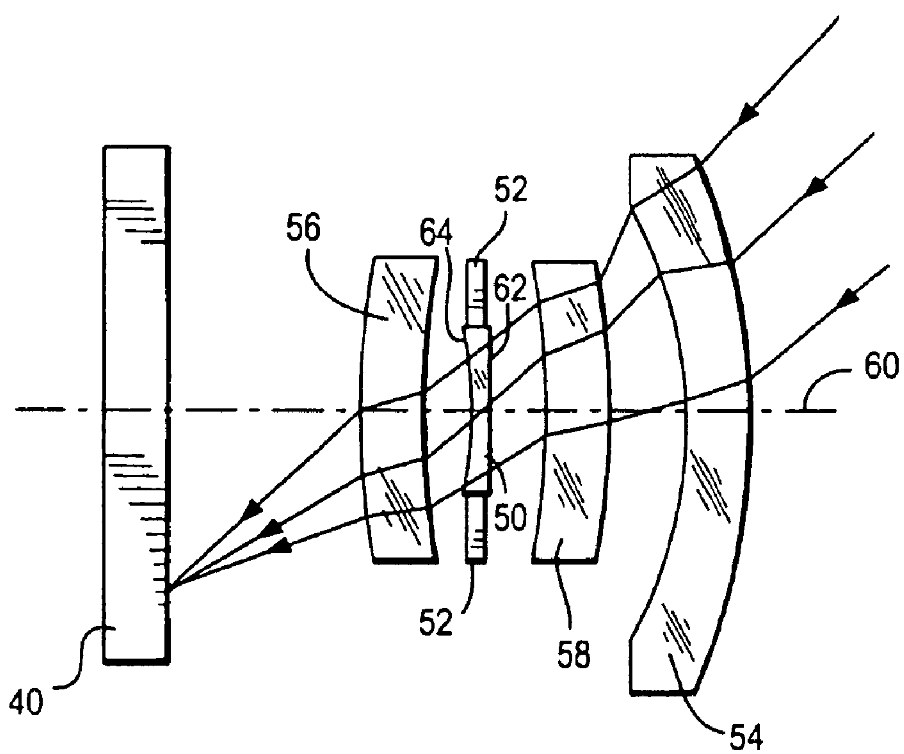
FIG. 5 is a view analogous to FIG. 4, but for focusing off-axis illumination light onto the imager in accordance with this invention.
Figure 4:
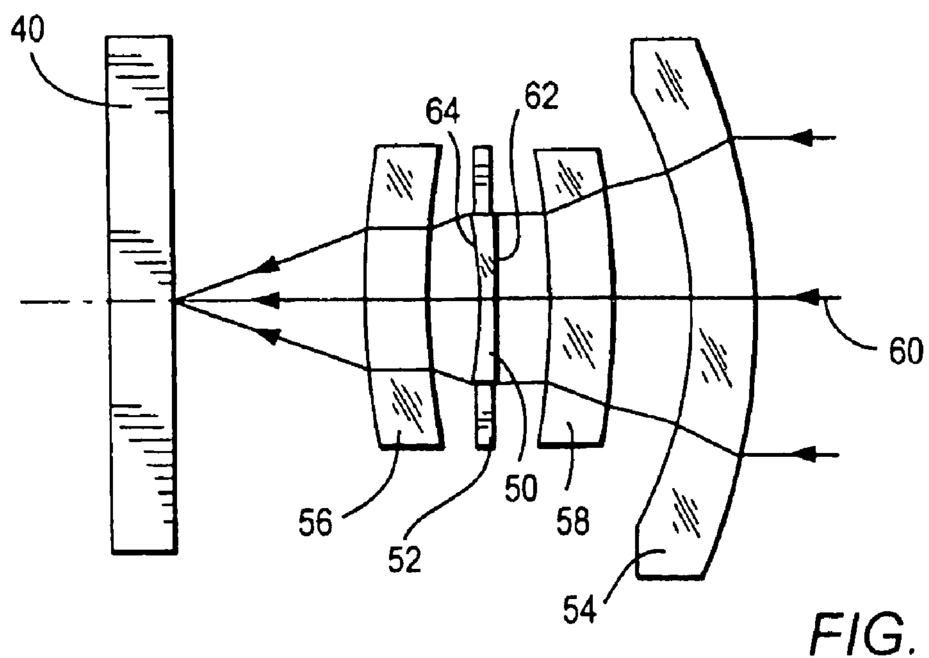
FIG. 4 is a schematic view of a negative spherical aberration component-based imaging lens assembly for focusing on-axis illumination light onto an imager in accordance with this invention.

In accordance with the invention, as depicted in FIGS. 4-5, the lens assembly includes a negative spherical aberration component 50 and an aperture stop 52 located in an optical path or axis 60, the negative spherical aberration component 50 and the aperture stop 52 being together operative for focusing both on-axis (FIG. 4) and off-axis (FIG. 5) illumination light on and over the plane of the array of the imager 40, and for extending the working range (WD1 to WD2). The negative spherical aberration component 50 is preferably positioned as close as possible to the aperture stop 52 and, preferably, the negative spherical aberration component 50 is located within, and is coplanar with, the aperture of the aperture stop. In the preferred embodiment, the assembly further includes a pair of end focusing lenses 54, 56 spaced apart along the optical path 60, and the negative spherical aberration component 50 and the aperture stop 52 are located in the optical path 60 between the end focusing lenses 54, 56. Still another lens 58 may be provided in the path 60. In other embodiments, all of the lenses can be located at either side of the coplanar negative spherical aberration component and the aperture stop. The negative spherical aberration component and the aperture stop may be separate components or preferably are incorporated into a single optical component. It is especially preferred if the negative spherical aberration component, the aperture stop and one of the lenses, e.g. 58, of the assembly are fabricated as a single optical component constituted, for example, of plastic or glass. Thus, the negative spherical aberration component effect can be incorporated, e.g. by molding, in an outer surface of the lens 58; and the aperture stop can be formed from an apertured coating applied on the outer surface of the lens 58, or by molding into the lens 58. The negative spherical aberration can be introduced by application of plastic aspheric replica on a glass substrate, or directly on lens 58 to form an integrated one-piece construction. Alternatively, the negative spherical aberration can be introduced by a separate optical component, e.g., a phase plate.

Where the negative spherical aberration component is a separate optical element, it preferably has a substantially flat surface 62 generally perpendicular to the optical path, and a second concave surface 64 centered on the optical path. The negative spherical aberration component can receive incident illumination light through the flat surface 62 and bend, e.g., by refraction, the illumination light for passage through its concave surface 64. The negative spherical aberration component is circular and preferably optically symmetrical about the optical path. The refractive negative spherical aberration component can have alternate shapes, e.g., elliptical or cylindrical, and/or can be replaced with a diffractive element, although this is not preferred since the refractive negative spherical aberration component has superior contrast and a higher signal-to-noise ratio because it eliminates stray light and chromatic aberrations associated with diffractive negative spherical aberration components.

The aperture stop 52 limits the size and/or shape of the light that passes therethrough. The limited extent of the light passing through the aperture stop, together with the light bending properties of the negative spherical aberration component 50, focus both on-axis and off-axis illumination light on and over the plane of the array, and establish an extended working range for the imaging reader 20 or 30. Preferred embodiments use circular apertures that limit the radius of light passing therethrough; however, other aperture shapes, such as elliptical or rectangular, can be used.

For a 5 mil target, i.e., bar or space of a symbol, the negative spherical aberration component and aperture stop in a prototype of this invention have increased the working range over known lens assemblies by about 40%, i.e., from a WD2 of about 7 inches to a WD2 of about 10 inches while maintaining a sharp, high-contrast image capable of being decoded and read.

Negative spherical aberration is an intrinsic defect that prevents light from being focused at a precise point. It is conventional for an optical designer to compensate for and correct such aberrations. However, in accordance with this invention, a deliberately overcorrected optical lens component is used for increasing the working range. No apodization at the plane of the aperture stop is needed, since a conventional aperture stop can be employed.

It will be understood that each of the elements described above, or two or more together, also may find a useful application in other types of constructions differing from the types described above. Thus, readers having different configurations can be used. Also, this invention is not intended to be limited to reading one- or two-dimensional bar code symbols since other indicia such as text in document imaging can be read.

While the invention has been illustrated and described as a compact imaging lens assembly for focusing light onto an imager in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth In the appended claims.

We claim:

1. A reader for electro-optically reading indicia in a working range of distances, comprising:

a) a housing having a presentation area;

b) a solid-state imager in the housing and including an array of image sensors for capturing light through the presentation area from the indicia over a field of view during reading; and c) an imaging lens assembly for focusing the light from the indicia along an optical path onto the sensors, including a negative spherical aberration component and an aperture stop together operative for extending the working range.

2. The reader of claim 1, wherein the assembly includes a plurality of lenses spaced apart along the optical path, and wherein the negative spherical aberration component is located in a plane of the aperture stop in the optical path.

3. The reader of claim 1, wherein the negative spherical aberration component is optically symmetrical about the optical path.

4. The reader of claim 1, wherein the negative spherical aberration component is a refractive component.

5. The reader of claim 1, wherein the negative spherical aberration component and the aperture stop are incorporated into a single optical component.

6. The reader of claim 1, and an illuminator in the housing for illuminating the indicia during reading with illumination light directed from an illuminating light source through the presentation area, and wherein the imaging lens assembly is operative for focusing the illumination light captured from the indicia onto the sensors.

7. The reader of claim 6, wherein the illuminating light source includes a plurality of light emitting diodes (LEDs).

8. The reader of claim 1, wherein the housing has a handle for handheld operation.

9. The reader of claim 1, wherein the housing has a base for supporting the housing on a support surface for workstation operation.

10. A reader for electro-optically reading indicia in a working range of distances, comprising:

a) housing means having a presentation area;

b) imaging means in the housing means including a solid-state imager having an array of image sensors for capturing light through the presentation area from the indicia over a field of view during reading; and c) imaging lens means for focusing the light from the indicia along an optical path onto the sensors, including a negative spherical aberration component and an aperture stop together operative for extending the working range.

11. A method of electro-optically reading indicia in a working range of distances, comprising the steps of:

a) capturing light through a presentation area of a reader from the indicia over a field of view during reading by an array of image sensors of a solid-state imager; and b) focusing the light from the indicia along an optical path onto the sensors, and extending the working range, by positioning a negative spherical aberration component and an aperture stop in the optical path.

12. The method of claim 11, and spacing a plurality of lenses apart along the optical path, and locating the negative spherical aberration component in a plane of the aperture stop in the optical path.

13. The method of claim 11, and configuring the negative spherical aberration component to be optically symmetrical about the optical path.

14. The method of claim 11, and configuring the negative spherical aberration component as a refractive component.

15. The method of claim 11, and incorporating the negative spherical aberration component and the aperture stop into a single optical component.

16. The method of claim 11, and illuminating the indicia during reading with illumination light directed from an illuminating light source through the presentation area, and wherein the focusing step is performed by focusing the illumination light captured from the indicia onto the sensors.

17. The method of claim 16, and forming the illuminating light source as a plurality of light emitting diodes (LEDs).

18. The method of claim 11, and the step of holding the reader by a handle for handheld operation.

19. The method of claim 11, and the step of supporting the reader on a support surface for workstation operation.

20. An imaging lens assembly for focusing light from indicia in a working range of distances along an optical path onto a solid-state imager, comprising:

a) an aperture stop in the optical path; and b) a negative spherical aberration component in a plane of the aperture stop in the optical path and together with the aperture stop are operative for extending the working range.

* * * * *